United States Patent
Onodera et al.

(10) Patent No.: US 8,522,533 B2
(45) Date of Patent: Sep. 3, 2013

(54) METHOD OF PURIFYING EXHAUST GAS AND EXHAUST GAS PURIFICATION SYSTEM

(75) Inventors: Takao Onodera, Fujisawa (JP); Naofumi Ochi, Fujisawa (JP); Shigeru Ikeda, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 994 days.

(21) Appl. No.: 12/227,931

(22) PCT Filed: May 14, 2007

(86) PCT No.: PCT/JP2007/059879
§ 371 (c)(1),
(2), (4) Date: Dec. 3, 2008

(87) PCT Pub. No.: WO2007/145045
PCT Pub. Date: Dec. 21, 2007

(65) Prior Publication Data
US 2009/0183495 A1  Jul. 23, 2009

(30) Foreign Application Priority Data
Jun. 12, 2006 (JP) .................. 2006-162613

(51) Int. Cl.
*F01N 3/00* (2006.01)

(52) U.S. Cl.
USPC .............. 60/295; 60/297; 60/285; 60/301

(58) Field of Classification Search
USPC ............... 60/285, 286, 295, 297, 311
See application file for complete search history.

(56) References Cited

U.S. PATENT DOCUMENTS

| | | | |
|---|---|---|---|
| 2002/0002822 A1* | 1/2002 | Sasaki ........................... | 60/280 |
| 2003/0106308 A1* | 6/2003 | Gabe et al. ..................... | 60/295 |
| 2004/0172935 A1* | 9/2004 | Otake et al. ..................... | 60/295 |
| 2004/0261401 A1* | 12/2004 | Ohkl et al. ..................... | 60/285 |
| 2005/0274106 A1* | 12/2005 | Suzuki et al. ................... | 60/285 |
| 2006/0032217 A1* | 2/2006 | Kondou et al. ................. | 60/297 |
| 2006/0179826 A1* | 8/2006 | Kuboshima et al. ............ | 60/297 |

FOREIGN PATENT DOCUMENTS

JP   59-28011   2/1984

(Continued)

OTHER PUBLICATIONS

JP2005-139944 Translation.*

(Continued)

*Primary Examiner* — Thomas Denion
*Assistant Examiner* — Patrick Maines
(74) *Attorney, Agent, or Firm* — Staas & Halsey LLP (57) ABSTRACT

When an internal combustion engine is in a low rotation speed driving condition, a duration of the low rotation speed driving condition is measured, and when this duration exceeds a predetermined time, the forced regeneration control is performed. Thus, even when an exhaust flow rate is small and an estimation of a particulate matter accumulated amount due to a pressure difference between front and back sides of a filter is difficult, a forced regeneration time can be accurately judged, the deterioration of fuel efficiency that is caused by excessive trapped particulate matter can be avoided, and thermal runaway that is caused by the excessive particulate matter, and the melting damage of the diesel particulate filter due to this thermal runaway, can be prevented.

4 Claims, 3 Drawing Sheets

(56) References Cited

FOREIGN PATENT DOCUMENTS

| | | |
|---|---|---|
| JP | 08-061043 | 3/1996 |
| JP | 2003-269139 | 9/2003 |
| JP | 2005-54634 | 3/2005 |
| JP | 2005139944 A * | 6/2005 |
| JP | 2005-299585 | 10/2005 |
| JP | 2005-315190 | 11/2005 |

OTHER PUBLICATIONS

International Search Report for corresponding WIPO application PCT/JP2007/059879; mailed Aug. 14, 2007.

Japanese Abstract, Publication No. 08-061043, published Mar. 5, 1996.

* cited by examiner

METHOD OF PURIFYING EXHAUST GAS AND EXHAUST GAS PURIFICATION SYSTEM

CROSS REFERENCE TO RELATED PATENT APPLICATIONS

This application claims the benefit under 35 U.S.C. Section 371, of International Application No. PCT/JP2007/059879, filed May 14, 2007, which claimed priority to Japanese Application No. 2006-162613, filed Jun. 12, 2006, in the Japanese Patent Office, the disclosures of all of which are hereby incorporated by reference.

BACKGROUND OF THE INVENTION

1. Field of the Invention

The present invention relates to a method of purifying exhaust gas and an exhaust gas purification system performing a forced regeneration control by accurately judging the regeneration time of a diesel particulate filter even in the case of performing a low rotation speed driving such as driving while the vehicle is stopped and driving while idling for a very long time.

2. Description of the Related Art

The regulation of the exhaust amount of particulate matter (PM: Particulate Matter: below, referred to as PM) exhausted from a diesel engine has been reinforced every year as well as that of NOx, CO, HC, etc. Techniques to decrease the amount of PM exhausted to the outside have been developed by collecting this PM with a filter called a diesel particulate filter (DPF: Diesel Particulate Filter: below, referred to as DPF). Among those, there is a continuous regeneration type DPF apparatus carrying a catalyst.

In this continuous regeneration type DPF apparatus, PM collected by the filter is continuously combusted and purified, and the filter self-regenerates when the exhaust gas temperature is about 350° C. or more. However, in the case that the exhaust temperature is low, because the temperature of the catalyst decreases and does not activate, the oxidation reaction is not promoted. Because of that, it becomes difficult to self-regenerate the filter by oxidizing the PM. As a result, clogging-up progresses due to the deposition of PM onto the filter, and therefore a problem of raising the exhaust pressure is generated due to this clogging-up.

Then, when the clogging-up of the filter exceeds a predetermined amount, a forced regeneration control is performed in which the collected PM is forcibly combusted and removed by forcibly increasing the temperature of the exhaust gas by a multi injection (a multiple stage delay injection), a post injection (after injection), etc. in a cylinder. In this forced regeneration control, HC (hydrocarbon) that is supplied into the exhaust gas by the post injection, etc. is combusted with an oxidation catalyst that is arranged in the upstream side of the filter or an oxidation catalyst that is carried in the filter. Using this combustion heat, the exhaust gas temperature at the filter entrance or the filter surface is increased. PM is combusted and removed by increasing the temperature of the filter to a temperature at which PM that is accumulated in the filter is combusted or more with this exhaust gas that is at a high temperature.

The degree of this clogging-up of the filter is generally judged by the pressure difference between the front and the back sides of the filter. However, in the case of performing idling for a long time while turning an engine on in cold districts where it is difficult to start the engine, in the case of being caught in a traffic jam, in the case of parking a refrigerator car, etc. day and night, etc., it becomes a stopped and idling condition, and the flow rate of the exhaust gas is small. Because of that, it is difficult to estimate the accumulated amount of PM from the pressure difference between the front and the back sides of the filter, and the regeneration time cannot be accurately judged. Therefore, with the judgment only by the pressure difference between the front and the back sides of the filter, the timing to start the forced regeneration control is missed, and a possibility is generated in which PM is over-collected.

As one of the countermeasures of the decrease of accuracy of this pressure difference, as described in Japanese Patent Application Kokai Publication No. 2005-299585 for example, a device for detecting the collected amount of particulates in the exhaust from engine is proposed in which engine is controlled so that the exhaust flow rate temporarily becomes a predetermined flow rate or more every time the vehicle travels for a predetermined distance or every time the stopped idling time reaches to a predetermined time when the exhaust flow rate is less than the predetermined flow rate and the PM collected amount is estimated from the front-back pressure difference during this time. However, in this device, a control of the engine is performed in which the exhaust flow rate is temporarily increased while driving when the exhaust flow rate is low. Because of that, the driver feels a sense of incongruity, and there is a problem that fuel efficiency deteriorates.

Further, as described in Japanese Patent Application Kokai Publication No. 08-61043, a particulate filter regeneration device is proposed in which a judgment of the regeneration starting time by a particulate amount detection means (the pressure difference between the front and the back sides of the DPF or a constant passage of time) and a judgment of the regeneration starting time by the running time from the previous filter regeneration process are used together, and in the case that any of the judgment results is a time to start, a regeneration means is started. However, in the judgment of the regeneration starting time by constant passage of time and the judgment of the regeneration starting time by the running time from the previous filter regeneration process, various driving conditions are passed through in which the PM accumulated amount per unit time differs during the constant time or during the running time. Because of that, it is difficult to estimate an accurate PM deposition amount, and there is a problem that an error is generated in the regeneration time.

Furthermore, as described in Japanese Patent Application Koai Publication No. 59-28011 for example, an exhaust purification device of a diesel engine is proposed in which the clogging-up condition of the filter member is determined from the sum of two values of which each of the running distance and the idling time is considered. However, in the judgment by the running distance, it is difficult to estimate an accurate PM deposition amount, and there is a problem that an error is generated in the regeneration time because various driving conditions are passed through in which the PM accumulated amount per unit time differs even if it is the same running distance.

Patent Document 1: Japanese Patent Application Kokai Publication No. 2005-299585
Patent Document 2: Japanese Patent Application Kokai Publication No. 08-61043
Patent Document 3: Japanese Patent Application Kokai Publication No. 59-28011

SUMMARY OF THE INVENTION

The present invention is performed to solve the above-described problem, and its objective is to provide a method of purifying exhaust gas and an exhaust gas purification system in which the following effects can be obtained even in the case of operating for a long time in a low rotation speed driving condition in which the exhaust flow rate is small and the estimation of the PM accumulated amount by the pressure difference between the front and the back sides of the filter is difficult, etc. The forced regeneration time can be accurately judged, and an increase of exhaust pressure due to an excessive collection of PM and a deterioration of fuel efficiency that is caused by the excessive collection can be avoided. With it, thermal runaway that is generated by the excessive accumulated amount of PM and melting damage of the DPF due to this thermal runaway can be prevented.

MEANS SOLVING THE PROBLEMS

The exhaust gas purifying method in the present invention to achieve the above-described objectives is equipped with an exhaust gas purification apparatus in which an oxidizing catalyst apparatus carrying an oxidizing catalyst and a DPF (diesel particulate filter) are arranged in order from the upstream side, or an exhaust gas purification apparatus in which a DPF carrying an oxidizing catalyst is arranged in an exhaust passage of an internal combustion engine, and an exhaust gas purification system that performs a forced regeneration control by judging the above-described forced regeneration starting time of the DPF from the above-described pressure difference between the front and the back sides of the DPF, is characterized in that in the case of detecting that the driving condition of the internal combustion engine is a low rotation speed driving condition, the sustaining time of the low rotation speed driving condition is measured, and when the measured sustaining time described above exceeds a predetermined time for judgment, a regeneration control of the above-described DPF is performed without being affected with the pressure difference between the front and the back sides of the above-described DPF.

According to this method, because the detection accuracy of the PM accumulation estimated amount by the pressure difference between the front and the back sides of the DPF decreases by the decrease of the exhaust gas flow rate in the low rotation speed driving condition, it becomes difficult to detect the front-back pressure difference, and on top of that, because the accuracy is poor even if it is detected, the judgment of the start of the forced regeneration by this front-back pressure difference is stopped during the low rotation speed driving condition. On the other hand, in the low rotation speed driving condition, the driving condition of the engine is relatively stable, and the PM exhaust amount is also stable. Because of that, the progress of the PM deposition in the low rotation speed driving condition has a corresponding relationship of being approximately proportional to the sustaining time of the low rotation speed driving condition. Therefore, in the low rotation speed driving condition, the judgment is made to start the forced regeneration control when the sustaining time of the low rotation speed driving condition exceeds a predetermined time for judgment without being affected by the front-back pressure difference.

With this, the problem of a decrease of the accuracy of detecting the front-back pressure difference in the low rotation speed driving condition can be solved with a very simple algorithm. Moreover, the detection of the front-back pressure difference becomes difficult when it is essentially at a low load and a medium load during low rotation speed. Because of that, the condition when performing the above-described forced regeneration control of the DPF may be made to be when the rotation speed is a low rotation speed and the load condition of the engine is a low or medium load.

Further, the above-described exhaust gas purification method is characterized in that the above-described low rotation speed driving condition is a driving condition while the vehicle is stopped and a condition of driving while idling. Moreover, an idle-up driving condition is included in this driving while idling condition.

That is, this low rotation speed driving condition is referred to as a condition in which the exhaust gas flow rate decreases and the accuracy of the detection of the PM accumulation amount due to the pressure difference between the front and the back sides of the DPF decreases. A condition that the rotation speed of the engine is lower than a predetermined rotation speed, a condition in which the vehicle speed is zero, a condition in which the transmission is in park, a condition in which the accelerator pedal (accelerator sensor) is at accelerator-off, etc., correspond to this low rotation speed driving condition. Because of that, not only in the case that the rotation speed of the engine is a predetermined rotation speed for judgment or less, it may be configured to judge the low rotation speed driving condition with a combination of any of several cases such that the vehicle speed is zero, the transmission is in park, the accelerator pedal is off, etc. Moreover, this predetermined rotation speed for judgment differs depending on the type of the engine and the use of the vehicle, etc. However, it can be easily set in advance based on experiment, idle rotation speed, and rotation speed during idle-up, etc.

More specifically, this low rotation speed driving condition is estimated to be a driving condition such that driving while idling is continued over 3 hours or more such as driving while idling for keeping a refrigerator cool during a shortage of hands, driving while idling accompanied with air-conditioned or heated driving when the driver is taking a nap during the day or night, etc.

This predetermined time for judgment may be fixed. For example, when the PM deposition estimation amount becomes about 70 to 90%, a maximum value of the sustaining time of the low rotation speed driving condition that can tolerate the deposition of PM is obtained by experiment, calculation, etc., and the predetermined time for judgment time may be within this obtained time (for example, a few hours, etc.). In this case, because the predetermined time for judgment is set with margin in time, in the case that it enters to the low rotation speed driving condition right after the forced regeneration control, the forced regeneration control is performed before PM deposits sufficiently, and therefore, the forced regeneration control is performed in vain.

Therefore, in order to further decrease the number of the regenerations, it is preferably configured to start the forced regeneration control by considering the PM deposition estimation amount right before the start of the low rotation speed driving condition. In the above-described exhaust gas purification method, the above-described predetermined time for judgment is preferably set depending on the above-described pressure difference between the front and the back sides of the DPF or the PM deposition estimation amount calculated from this front-back pressure difference.

This control can be easily performed by a configuration where map data is prepared in advance of the predetermined judgment time that is based on the PM deposition estimation amount right before the start of the low rotation speed driving condition, it is memorized in a control device, and the predetermined time for judgment is calculated by referring to this map data when setting the predetermined time for judgment during control of the judgment to start a forced regeneration, etc. With this configuration, the number of the forced regenerations can be reduced, and therefore, the fuel efficiency can be saved.

Furthermore, the above-described predetermined time for judgment is preferably set depending on the remaining deposition amount that is the difference between the above-described PM tolerable amount of the DPF and the PM deposition estimation amount right before the start of the above-described low rotation speed driving condition. This control can be easily performed by the following configuration, among others. The tolerable deposition amount is divided by the PM deposition estimation amount per unit time of the low rotation speed driving condition, and it is made to be a tolerable sustaining time. The difference between this tolerable sustaining time and the sustaining time at the start is made to be the predetermined time for judgment. It is configured to start the forced regeneration control in the case that the sustaining time of the low rotation speed driving condition passes this predetermined time for judgment. With this configuration, a regeneration interval can be obtained with better accuracy, the number of forced regenerations can be reduced, and the fuel efficiency can be saved.

Further, the exhaust gas purification system to achieve the objective as described above is equipped with an exhaust gas purification apparatus in which an oxidizing catalyst apparatus carrying an oxidizing catalyst and a DPF (diesel particulate filter) are arranged in order from the upstream side, or an exhaust gas purification apparatus in which a DPF carrying an oxidizing catalyst and a regeneration control apparatus that performs a control to forcibly regenerate the above-described DPF are arranged in an exhaust passage of an internal combustion engine, and in an exhaust gas purification system that performs a forced regeneration control by judging the above-described forced regeneration starting time of the DPF from the above-described pressure difference between the front and the back sides of the DPF, the above-described regeneration control apparatus is configured such that in the case of detecting that the driving condition of the internal combustion engine is in a low rotation speed driving condition, the sustaining time of the low rotation speed driving condition is measured, and when the measured sustaining time described above exceeds a predetermined time for judgment, the above-described forced regeneration control of the DPF is performed without being affected by the above-described pressure difference between the front and the back sides of the DPF.

Further, in the above-described exhaust gas purification system, the above-described low rotation speed driving condition is configured to be a driving condition while the vehicle is stopped and a condition of driving while idling.

Furthermore, in the above-described exhaust gas purification system, the above-described regeneration control apparatus is configured to set the above-described predetermined time for judgment depending on the above-described pressure difference between the front and the back sides of the DPF or depending on the PM deposition estimation amount that is calculated from the front-back pressure difference, right before the start of the above-described low rotation speed driving condition. Further, in the exhaust gas purification system described above, the above-described regeneration control apparatus is configured to set the above-described predetermined time for judgment depending on the remaining deposition amount that is the difference between the above-described tolerable deposition amount of the DPF and the PM deposition estimation amount right before the start of the above-described low rotation speed driving condition.

According to the exhaust gas purification system with the above-described configuration, the above-described exhaust gas purifying method can be performed, and the same effect can be produced.

ADVANTAGES OF THE INVENTION

According to the exhaust gas purifying method and the exhaust gas purification system affecting the present invention, because the estimation method of the PM accumulation amount is changed depending on the level of the exhaust flow rate, the PM accumulation amount is estimated by the pressure difference between the front and the back sides of the filter in the case that the exhaust flow rate is large, and the PM accumulation amount is estimated by the sustaining time of driving in a low rotation speed driving condition in which the exhaust flow rate is small, even in the case of driving for a long time in a low rotation speed driving condition such as a condition when the vehicle is stopped a condition of driving while idling, and the exhaust pressure can be avoided from increasing due to excessively trapped PM, and at the same time, thermal runaway that is generated by the excessive accumulation amount of PM and melting damage of the DPF due to this thermal runaway can be prevented. Further, the deterioration of the fuel efficiency can be avoided.

EXPLANATION OF THE REFERENCE NUMERALS

1 Exhaust Gas Purification System
10 Diesel Engine (Internal Combustion Engine)
12 Continuous Regeneration Type DPF Apparatus
12a Oxidation Catalyst
12b Filter with Catalyst
31 Differential Pressure Sensor
40 Control Apparatus (ECU)
Ne Rotation Speed of Engine
Nec Predetermined Rotation Speed
PMc Predetermined PM Deposition Amount for Judgment
PMp PM Accumulation Estimation Amount
tc Predetermined Time for Judgment
tm Sustaining time of the Low rotation speed driving Condition

DESCRIPTION THE EMBODIMENTS

Figure 1:
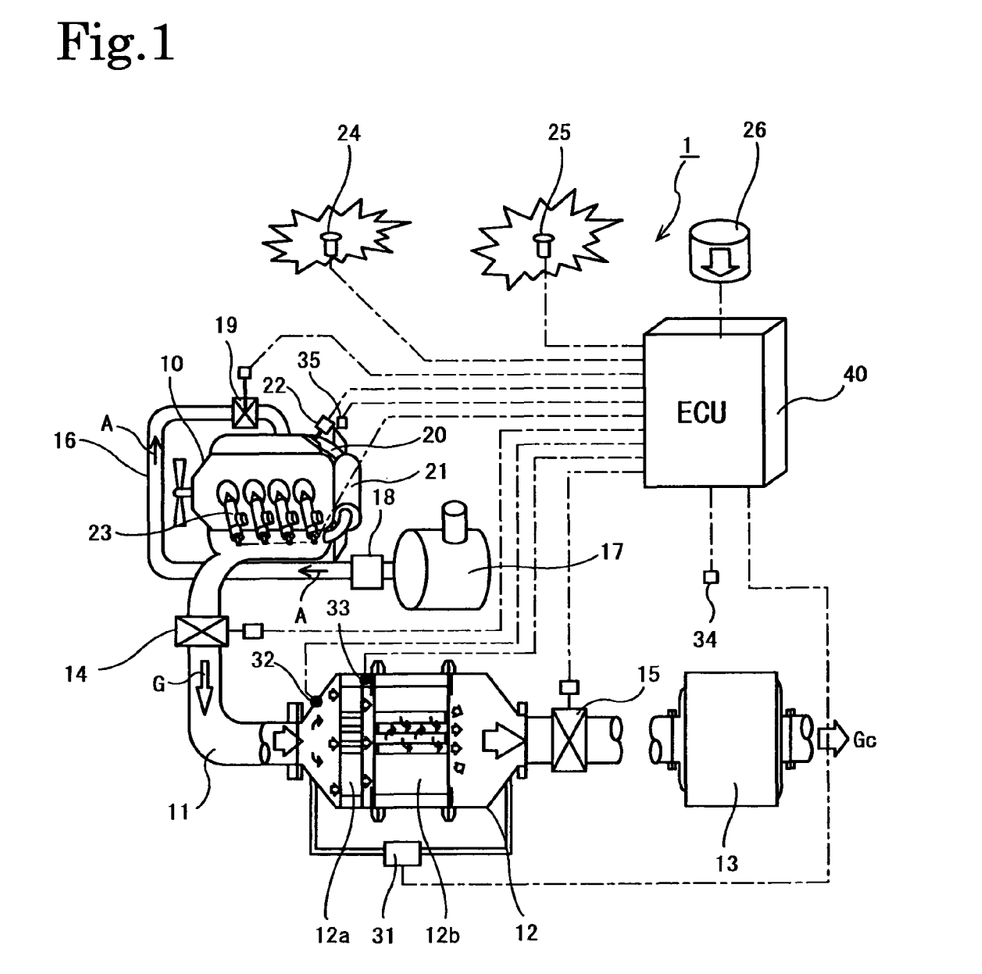
FIG. 1 is a drawing showing the entire configuration of the exhaust gas purification system.

Below, the controlling method of the exhaust gas purification system and the exhaust gas purification system in the embodiments affecting the present invention are explained referring to the drawings. The configuration of an exhaust gas purification system 1 in this embodiment is shown in FIG. 1.

This exhaust gas purification system 1 is configured by being equipped with an exhaust gas purification apparatus 12 and a silencer 13 in an exhaust passage 11 of a diesel engine (internal combustion engine) 10. This exhaust gas purification apparatus 12 is one of a continuous regeneration type DPF (diesel particulate filter) apparatus. This exhaust gas purification apparatus 12 is configured by arranging an oxidation catalyst apparatus 12a in the upstream side and a filter apparatus with a catalyst 12b in the downstream side.

This oxidation catalyst apparatus 12a is formed by carrying an oxidation catalyst such as platinum (Pt) on a carrier such as a honeycomb structure of porous ceramic, etc. The filter apparatus with a catalyst 12b is formed with a monolithic honeycomb wall flow type filter in which the entrance and the exit of a honeycomb channel of the porous ceramic are sealed alternately, etc. PM (particulate matter) in the exhaust gas G is trapped by the porous ceramic wall. Further, a catalyst such as platinum and cerium oxide is carried on this filter part.

Then, in order to estimate the deposited amount of PM of the filter apparatus with a catalyst 12b, a differential pressure sensor 31 is provided in a conduit that is connected before and after the exhaust gas purification apparatus 12. Further, an exhaust brake valve (exhaust brake) 14 is provided in the upstream side of this exhaust gas purification apparatus, and an exhaust throttle valve (exhaust throttle) 15 is provided in the downstream side.

Further, an air cleaner 17, a MAF sensor (intake air flow sensor) 18, and an intake throttle 19 are provided in an intake passage 16. This intake throttle 19 adjusts the amount of intake air A that enters into an intake manifold. Further, an EGR cooler 21 and an EGR valve 22 that adjusts the EGR amount are provided in an EGR passage 20.

Furthermore, an oxidation catalyst inlet exhaust temperature sensor 32 is provided in the upstream side of the oxidation catalyst apparatus 12a, and a filter inlet exhaust temperature sensor 33 is provided between the oxidation catalyst apparatus 12a and the filter apparatus with a filter 12b. This oxidation catalyst inlet exhaust temperature sensor 32 detects an oxidation catalyst inlet exhaust temperature Tg1 that is the temperature of the exhaust gas that flows into the oxidation catalyst apparatus 12a. Further, the filter inlet exhaust gas temperature sensor 33 detects a filter inlet exhaust temperature Tg2 that is the temperature of the exhaust gas that flows into the filter apparatus with a catalyst 12b.

The outputs of these sensors are input into a control apparatus (ECU: engine control unit) 40 that performs a general control of driving of an engine 10 and also performs the forced regeneration control of the exhaust gas purification apparatus 12. With these control signals that are output from this control apparatus 40, the exhaust brake valve 14, the exhaust throttle 15, the intake throttle 19, the EGR valve 22, a fuel injection apparatus (injection nozzle) 23, etc. are controlled.

This fuel injection apparatus 23 is connected to a common rail injection system (not shown in the drawings) that temporarily stores a high pressure fuel of which the pressure is increased by a fuel pump (not shown in the drawing). Other than information such as the accelerator opening from an accelerator position sensor (APS) 34 and the engine rotation speed from a rotation speed sensor 35, information such as the vehicle speed and the coolant temperature is also input into the control apparatus 40 for driving the engine 10. Current carrying time signals are output from this control apparatus 40 so that a predetermined amount of the fuel can be injected from the fuel injection apparatus 23.

Further, in the forced regeneration control of this exhaust gas purification apparatus 12, not only for the forced regeneration performed automatically during running, but also for forced regeneration arbitrarily by a driver after stopping the vehicle, a flashing lamp (DPF lamp) 24 and an emergency flashing lamp 25 that is a warning means to rouse attention, and a manual regeneration button (manual regeneration switch) 26 are provided. This warning means is a means to request attention of the driver, when the trapped amount of PM of the filter apparatus with a catalyst 12b exceeds a constant amount and the filter apparatus with a catalyst 12b is clogged.

In the control of this exhaust gas purification system 1, PM is trapped during a normal driving. In this normal driving, whether it is time to start the forced regeneration or not is monitored, and the forced regeneration control is performed when it is judged to be the time to start the forced regeneration control. There are a running automatic regeneration in which the forced regeneration control is performed during running and a manual regeneration that is started by pressing the manual regeneration button 26 by the driver after stopping the vehicle due to a warning. These are appropriately selected and performed by the running distance and the value of the DPF differential pressure. Moreover, the regeneration control apparatus that performs these forced regeneration controls is incorporated in the control apparatus 40.

In this forced regeneration control, the exhaust temperature is increased by performing a multi injection and an exhaust throttle (when the vehicle is stopped), the post injection is performed when the filter inlet exhaust temperature Tg2 or the oxidation catalyst inlet exhaust temperature Tg1 becomes a predetermined temperature (200° C. to 250° C.) or more, and a forced regeneration is performed by increasing the filter inlet temperature Tg2. The filter inlet exhaust temperature Tg2 is detected in the filter inlet exhaust temperature sensor 33. Further, the oxidation inlet exhaust temperature Tg1 is detected in the oxidation catalyst inlet exhaust temperature sensor 32.

Then, in the present invention, at the judgment of the start of this forced regeneration control, a forced regeneration mode is executed basically when the front-back pressure difference $\Delta Pm$ that is detected in the differential pressure sensor 31 exceeds a predetermined differential pressure $\Delta Pc$. However, because the exhaust gas flow rate is small in the low rotation speed driving condition such as the condition of idling while stopped, the pressure difference $\Delta Pm$ between the front and the back sides of the filter with a catalyst 12b cannot be detected accurately, and the judgment of the start of the forced regeneration control by the front-back pressure difference $\Delta Pm$ cannot be performed accurately. Because of that, when the low rotation speed driving condition is continued by exceeding the predetermined time for judgment tm, the forced regeneration control is executed. The forced regeneration control at this time is performed in the same way as the forced regeneration control by the front-back pressure difference $\Delta Pm$. The regeneration may be initiated by a manual regeneration that is performed by the driver pressing the manual regeneration switch 26 when the flashing lamp 24 is flashing, or the automatic regeneration may be executed forcibly not by the driver.

Figure 2:
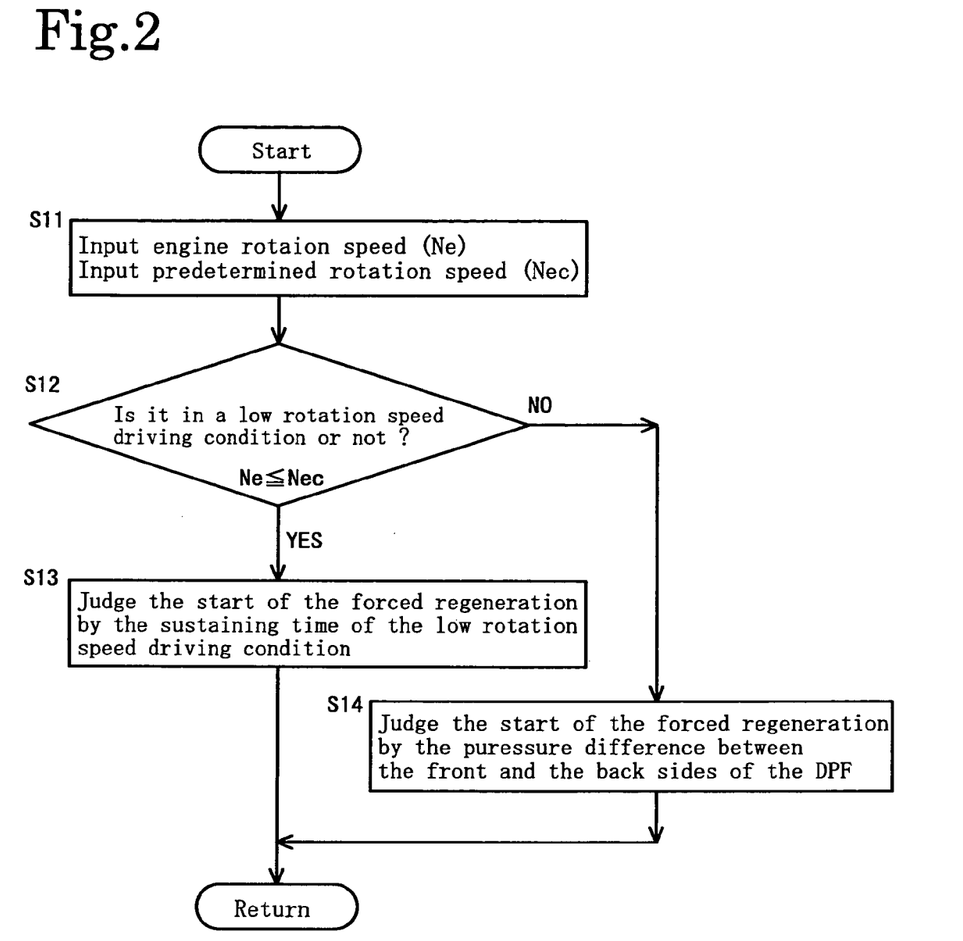
FIG. 2 is a drawing showing one example of the control flow of the judgment of the start of a forced regeneration.
Figure 3:
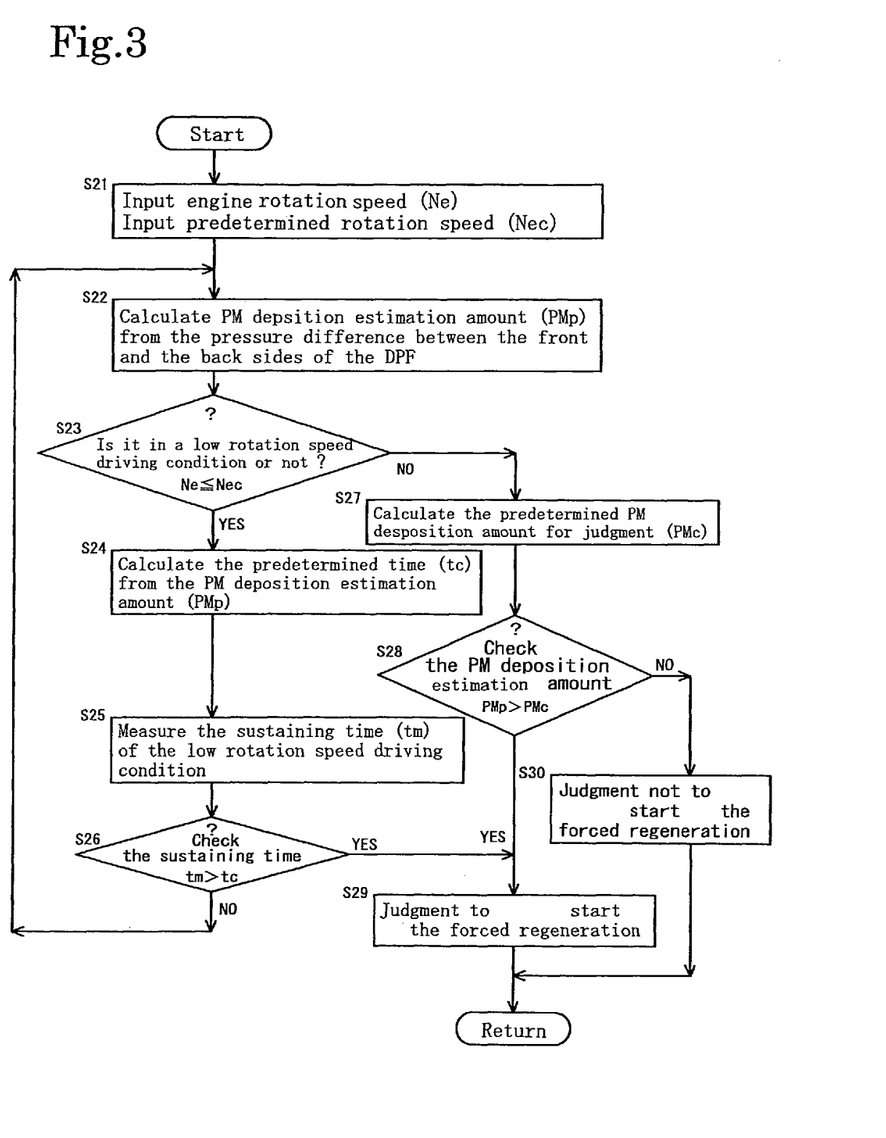
FIG. 3 is a drawing showing another example of the control flow of the judgment of the start of a forced regeneration.

Then, the judgment of the start of the forced regeneration control of this manual regeneration and the running automatic regeneration can be performed following to the control flow as exemplified in FIGS. 2 and 3 in this embodiment.

First, the control flow in FIG. 2 is explained. When this control flow in FIG. 2 starts, the engine rotation speed Ne is input in a step S11, and at the same time, the predetermined rotation speed Nec is input. In a next step S12, whether it is in the low rotation speed driving condition or not is judged. In this judgment, it is judged to be in the low rotation speed driving condition in the case that the engine rotation speed Ne is the predetermined rotation speed Nec or less (Ne≦Nec) and it is judged to be not in the low rotation speed driving condition in other cases.

When it is judged to be in the low rotation speed driving condition in the judgment of this step S12, it goes to a step S13, and the judgment of the start of the forced regeneration by the sustaining time tm of the low rotation speed driving condition is performed. In this judgment, it is judged to be the start of the forced regeneration when the sustaining time tm passes the predetermined time for judgment tc (tm>tc), and it is judged to be not the start of the forced regeneration in other cases. Then, it returns.

Further, when it is judged to be not in the low rotation speed driving condition in the judgment of the step S12, it goes to a step S14, and the judgment of the start of the forced regeneration by the pressure difference ΔPm between the front and the back sides of the filter with a catalyst 12b is performed. In this judgment, it is judged to be the start of the forced regeneration when the front-back pressure difference ΔPm that is detected in the differential pressure sensor 31 exceeds the predetermined differential pressure value ΔPc (ΔPm>ΔPc) or when a PM accumulation estimation amount PMp that is calculated from the front-back pressure difference ΔPm that is detected in the differential pressure sensor 31 exceeds the predetermined PM deposition amount for judgment PMc (PMp>PMc), and it is judged to be not the start of the forced regeneration in other cases. Then, it returns. This judgment result is performed by handing over a flag for judgment, etc. between the control flow in FIG. 2 and an upper level control flow that is the origin of calling this control flow.

When the control flow in FIG. 2 is completed and it returns to the upper level control flow, the forced regeneration control is performed if it is judged to be the start of the forced regeneration by the judgment result of the start of the forced regeneration in the control flow in FIG. 2, and if it is judged to be not the start of the forced regeneration, after the time is passed of the interval of the judgment of the start of the forced regeneration, the control flow in FIG. 2 is called again, and the judgment of the start of the forced generation is continued.

In this control flow in FIG. 2, the predetermined time for judgment tc is set with margin. For example, after the PM deposition amount becomes about 70 to 90%, it is fixed to a maximum value of the sustaining time of the low rotation speed driving condition that can tolerate the deposition of PM. This value can be obtained by experiment, calculation, etc., and it is normally set to 3 hours or more, a few hours, etc. for example.

Next, the control flow in FIG. 3 is explained. When this control flow in FIG. 3 starts, the engine rotation speed Ne is input in a step S21, and at the same time, the predetermined rotation speed Nec is input. In a next step S22, the PM deposition estimation amount PMp is calculated from the pressure difference ΔPm between the front and the back sides of the DPF. In a next step S23, whether it is in the low rotation speed driving condition or not is judged. In this judgment, it is judged to be in the low rotation speed driving condition in the case that the engine rotation speed Ne is the predetermined rotation speed Nec or less (Ne≦Nec) and it is judged to be not in the low rotation speed driving condition in other cases.

When it is judged to be in the low rotation speed driving condition in the judgment of this step S23, it goes to a step S24, the predetermined time for judgment tc is calculated from the PM deposition estimation amount PMp right before the start of the low rotation speed driving condition calculated in the step S22.

This predetermined time for judgment tc is calculated by referring to map data that is based on the PM deposition estimation amount PMp right before the start of the low rotation speed driving condition. This map data is set based on the result of experiment, calculation, etc., and they are input in the control apparatus in advance. Or, they may be memorized as a function, and in this case, the predetermined times for judgment tc are represented by function with the PM deposition estimation amount PMp. As for any cases, the bigger this PM deposition estimation amount PMp becomes, the smaller this predetermined time for judgment tc becomes.

With this calculation method of the predetermined time for judgment tc, the forced regeneration control can be started by considering the PM deposition estimation amount PMp right before the start of the low rotation speed driving condition. Because of that, the number of the forced regeneration controls can be decreased further than the control in the control flow in FIG. 2.

Or, the calculation of the predetermined time for judgment tc is performed as follows. The PM deposition estimation amount PMp right before the start of the low rotation speed condition is divided by the PM deposition estimation amount ΔPMp per unit time of the low rotation speed driving condition, and it is converted into a value that is equivalent to the sustaining time of the low rotation speed driving condition. This converted value is made to be a passing time at the start ts. The PM tolerable deposition amount PMmax is divided by the PM deposition estimation amount ΔPMp per unit time of the low rotation speed driving condition, and it is converted into a value that is equivalent to the sustaining time of the low rotation speed driving condition. This converted value is made to be a tolerable sustaining time tmax. The difference between the tolerable sustaining time tmax and the passing time at the start ts is made to be the predetermined time for judgment tc (=tmax−ts).

With this calculation method of the predetermined time for judgment tc, the forced regeneration control can be made to be started when the time (ts+tm), in which the sustaining time tm (corresponds to the PM accumulation estimation amount PMt in the low rotation speed driving condition) is added to this passing time at the start ts (corresponds to the PM deposition estimation amount PMp right before the start), exceeds the tolerable sustaining time tmax (corresponds to the PM tolerable deposition amount PMmax at the regeneration start).

That is, the predetermined time for judgment tc can be set depending on the remained deposition amount PMr (=PMmax−PMp) that is the difference between the PM tolerable deposition amount PMmax of the DPF and the PM deposition estimation amount PMp right before the start of the low rotation speed driving condition. With this, the judgment of the start of the regeneration control can wait until the PM deposition estimation amount PMm becomes the PM tolerable deposition amount PMmax. Therefore, the number of the forced regeneration controls can be further decreased. Moreover, this PM tolerable deposition amount PMmax is normally set to the same value as the predetermined PM deposition amount PMc for judgment.

In a next step S25, the sustaining time tm in the low rotation speed driving condition is measured. Here, the sustaining time tm is set to zero at the beginning of the control flow in FIG. 3 (for example, the step S21), and when this step S24 is performed, a predetermined time (time to go to a step S26 from the step S25) Δtm is added to the sustaining time tm cumulatively.

In a next step S26, a checking of the sustaining time tm is performed, and the judgment of the start of the forced regeneration is performed by the sustaining time tm in the low rotation speed driving condition. In this judgment, when the sustaining time tm passes the predetermined time for judgment tc (tm>tc), it proceeds to a step S29, and it is judged to be the start of the forced regeneration, and in other cases, it returns to the step S22.

Then, when it is judged not to be the low rotation speed driving condition in the judgment in the step S23, it proceeds to a step S27, and the judgment of the start of the forced regeneration is performed by the front-back pressure difference ΔPm. In this judgment in FIG. 3, the predetermined PM deposition amount PMc for judgment is calculated from the front-back pressure difference ΔPm in a step S27. In a next step S28, a checking of the PM deposition estimation amount PMp that is calculated in the step S22 is preformed.

When this PM deposition estimation amount PMp exceeds the predetermined PM deposition amount for judgment PMc (PMp>PMc), and it proceeds to a step S29, it is judged to be the start of the forced regeneration, and in other cases, it proceeds to a step S30, and it is judged not to be the start of the forced regeneration. Then, it returns. This judgment result is performed by handing over a flag for judgment, etc. between the control flow in FIG. 3 and an upper level control flow that is the origin of calling this control flow.

When the control flow in FIG. 3 is completed and it returns to the upper level control flow, the forced regeneration control is performed if it is judged to be the start of the forced regeneration by the judgment result of the start of the forced regeneration in the control flow in FIG. 3, and if it is judged to be not the start of the forced regeneration, after the time is passed of the interval of the judgment of the start of the forced regeneration, the control flow in FIG. 3 is called again, and the judgment of the start of the forced generation is continued.

In this control flow in FIG. 3, the predetermined time for judgment tc is calculated from the PM deposition estimation amount PMp right before the start of the low rotation speed driving condition by referring to the map data or with a function calculation. Or, the predetermined time for judgment tc is calculated using the PM tolerable deposition amount Pmax and the PM deposition estimation amount ΔPMp per unit time in the low rotation speed driving condition. These map data, the function representation, the PM deposition estimation amount ΔPMp per unit time in the low rotation speed driving condition, etc. can be set in advance by experiment, calculation, etc. These data are input and memorized in the control apparatus 30.

In these control flows in FIGS. 2 and 3, a condition of which the engine rotation speed Ne is the predetermined rotation speed Nec or less is used for the judgment of the low rotation speed driving condition. However, the detection of the front-back pressure difference ΔPm becomes difficult when it is essentially at a low load and a medium load during low rotation speed. Because of that, the low rotation speed driving condition may be made to be a condition of which the engine rotation speed Ne is a low rotation speed and the engine load condition is a low or a medium load. However, the control can be simplified when it is judged only by the engine rotation speed Ne.

Further, it is configured to be judged to be the low rotation speed driving condition, not only in the case that the engine rotation speed Ne is lower than the predetermined rotation speed for judgment Nec, but also in any cases such that the vehicle speed is zero, the transmission is in a parked condition, and the accelerator pedal is off, and the combination of a few of these. In short, this low rotation speed driving condition is referred to as a condition of which the exhaust gas flow rate becomes small and the accuracy of the detection of the PM accumulation amount by the front-back pressure difference ΔPm decreases, and therefore, it is sufficient if this condition can be detected accurately.

According to the above-described exhaust gas purification method and the exhaust gas purification system 1, the estimation method of the PM accumulation amount is switched depending on the level of the exhaust flow rate, and it is judged to be the start of the forced regeneration by the pressure difference ΔPm between the front and the back sides of the filter apparatus with a catalyst 12b in the case that the exhaust gas flow rate is large. And it is judged to be the start of the forced regeneration by the sustaining time tm of the low rotation speed driving condition during the low rotation speed condition when the exhaust flow rate is small. Because of that, an excessive trapping of PM and an increase of the exhaust pressure can be avoided even in the case of driving for a long time in the low rotation speed driving condition. Further, thermal runaway that is generated by the excessive accumulated amount of PM and melting damage of the filter apparatus with a catalyst 12b due to this thermal runaway can be prevented. Further, the deterioration of the fuel efficiency that is caused by the excessive trapping can be avoided.

Moreover, the above-described embodiment was explained by exemplifying a combination of the oxidation catalyst apparatus 12a in the upstream side and the filter with a catalyst 12b in the downstream side as the exhaust gas purification apparatus of the exhaust gas purification system. However, it may be a filter that carries an oxidation catalyst. Furthermore, it is explained with the post injection as a method of supplying a non-combusted fuel (HC) in the upstream side of the oxidation catalyst 12a. However, a method of a direct injection into a exhaust pipe may be adopted in which a non-combusted fuel supplying apparatus is arranged in the exhaust passage 16 and the non-combusted fuel is injected directly into the exhaust gas passage 16 from this non-combusted fuel supplying apparatus.

The exhaust gas purification method and the exhaust gas purification system in the present invention having the above-described excellent effects can be used extremely effectively as an exhaust gas purification system that performs a forced regeneration control by judging a forced regeneration starting time of the above-described diesel particulate filter from the pressure difference between the front and the back sides of the above-described diesel particulate filter. The system is equipped with an exhaust gas purification apparatus in which an oxidizing catalyst apparatus carrying an oxidizing catalyst and a diesel particulate filter are arranged in order from the upstream side, or an exhaust gas purification apparatus in which the diesel particulate filter carrying an oxidizing catalyst is arranged in an exhaust passage of an internal combustion engine, such as provided in an internal combustion engine that is loaded in a vehicle, and they.

What is claimed is:

1. An exhaust gas purification method for an exhaust gas purification system provided with an exhaust gas purification apparatus in which an oxidizing catalyst apparatus with an oxidizing catalyst and a diesel particulate filter are arranged in order from an upstream side in an exhaust passage of an internal combustion engine of a vehicle, or an exhaust gas purification apparatus in which a diesel particulate filter with an oxidizing catalyst is arranged in an exhaust passage of an internal combustion engine of a vehicle, comprising:

measuring a sustaining time of a low rotation speed driving condition, when detecting that a driving condition of the internal combustion engine is the low rotation speed driving condition;

setting a predetermined time for judgment depending on a remaining deposition amount that is a difference between a particulate matter tolerable amount of the diesel particulate filter and a particulate matter deposition estimation amount right before a start of the low rotation speed driving condition;

dividing a tolerable deposition amount by the particulate matter deposition estimation amount per unit time at the low rotation speed driving condition to arrive at a divided value;

making the divided value a tolerable sustaining time;

making a difference between the tolerable sustaining time and the measured sustaining time at the start to be the predetermined time for judgment; and performing a forced regeneration control of the diesel particulate filter without being affected by a pressure difference between a front and a back of the diesel particulate filter, when the measured sustaining time exceeds the predetermined time for judgment.

2. The method according to claim 1, wherein the low rotation speed driving condition is an idling condition while the vehicle is stopped.

3. An exhaust gas purification system, comprising an exhaust gas purification apparatus in which an oxidizing catalyst apparatus with an oxidizing catalyst and a diesel particulate filter are arranged in order from the upstream side in an exhaust passage of an internal combustion engine of a vehicle, or an exhaust gas purification apparatus in which a diesel particulate filter with an oxidizing catalyst is arranged in an exhaust passage of an internal combustion engine of a vehicle; and an electronic control unit configured to:

measure a sustaining time of a low rotation speed driving condition, when detecting that a driving condition of the internal combustion engine is the low rotation speed driving condition, set a predetermined time for judgment depending on a remaining deposition amount that is a difference between a particulate matter tolerable amount of the diesel particulate filter and a particulate matter deposition estimation amount right before a start of the low rotation speed driving condition, divide a tolerable deposition amount by the particulate matter deposition estimation amount per unit time at the low rotation speed driving condition to arrive at a divided value, and make the divided value a tolerable sustaining time, make a difference between the tolerable sustaining time and the measured sustaining time at the start to be the predetermined time for judgment, and perform a forced regeneration control of the diesel particulate filter without being affected by a pressure difference between a front and a back of the diesel particulate filter, when the measured sustaining time exceeds the predetermined time for judgment.

4. The exhaust system according to claim 3, wherein the low rotation speed driving condition is an idling condition while the vehicle is stopped.

* * * * *